United States Patent
Yamanouchi

(10) Patent No.: US 12,372,768 B2
(45) Date of Patent: Jul. 29, 2025

(54) MICROSCOPE OBJECTIVE

(71) Applicant: Evident Corporation, Tatsuno-machi (JP)

(72) Inventor: Kazuhiko Yamanouchi, Nagano (JP)

(73) Assignee: Evident Corporation, Nagano (JP)

( * ) Notice: Subject to any disclaimer, the term of this patent is extended or adjusted under 35 U.S.C. 154(b) by 444 days.

(21) Appl. No.: 18/076,040

(22) Filed: Dec. 6, 2022

(65) Prior Publication Data
US 2023/0185069 A1 Jun. 15, 2023

(30) Foreign Application Priority Data
Dec. 14, 2021 (JP) .................................. 2021-202597

(51) Int. Cl.
*G02B 21/02* (2006.01)

(52) U.S. Cl.
CPC .................................... *G02B 21/02* (2013.01)

(58) Field of Classification Search
CPC .................................................... G02B 21/02
See application file for complete search history.

(56) References Cited

U.S. PATENT DOCUMENTS

| | | | | |
|---|---|---|---|---|
| 8,358,469 B2 * | 1/2013 | Kasahara | ............... | G02B 21/33 359/656 |
| 2008/0180805 A1 * | 7/2008 | Yonetani | ............... | G02B 21/025 359/661 |
| 2010/0165474 A1 * | 7/2010 | Yonetani | ............... | G02B 21/02 359/661 |
| 2023/0152565 A1 * | 5/2023 | Kusui | ............... | G02B 21/02 359/656 |

FOREIGN PATENT DOCUMENTS

JP 3093835 B2 10/2000

* cited by examiner

*Primary Examiner* — Edmond C Lau
(74) *Attorney, Agent, or Firm* — Holtz, Holtz & Volek PC

(57) ABSTRACT

A microscope objective includes: a first group including a plurality of meniscus lenses with a concave surface facing an object side; a second group including a first cemented lens closest to the object side; a third group consisting of a positive single lens; a fourth group including a first cemented meniscus lens with a concave surface facing the object side; a fifth group consisting of a second cemented meniscus lens with a concave surface facing an image side; and a sixth group including a third cemented meniscus lens with a concave surface facing the object side, the first to sixth groups being arranged in order from the object side. The microscope objective satisfies the following conditional expression.

$$0 < |f/f5| < 0.15 \qquad (1)$$

Where, f is a focal length of the microscope objective. f5 is a focal length of the fifth group.

19 Claims, 16 Drawing Sheets

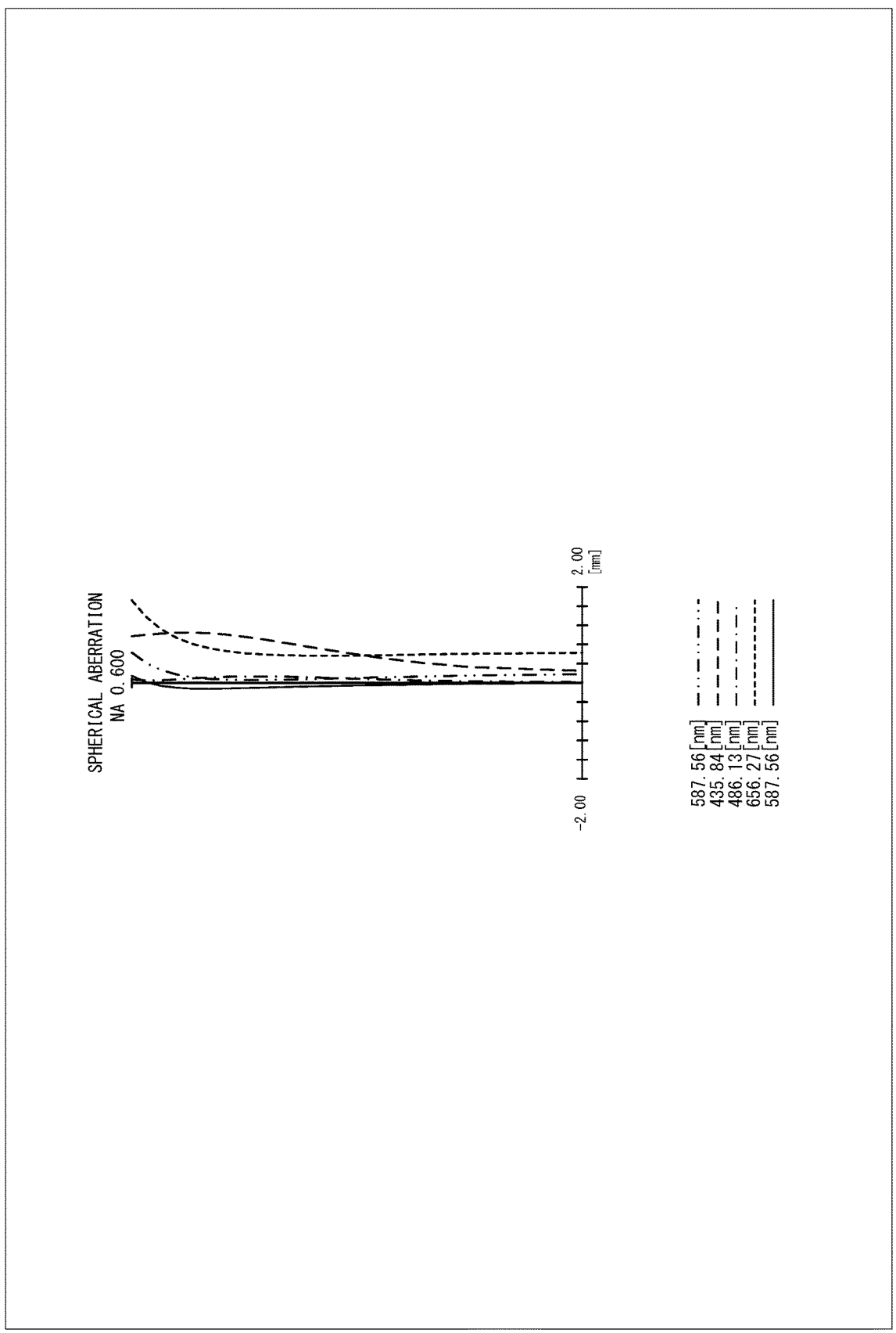

MICROSCOPE OBJECTIVE

CROSS REFERENCE TO RELATED APPLICATIONS

This application is based upon and claims the benefit of priority from prior Japanese Patent Application No. 2021-202597, filed Dec. 14, 2021, the entire contents of which are incorporated herein by this reference.

TECHNICAL FIELD

The disclosure herein relates to a microscope objective.

BACKGROUND

Objective lenses used in industrial applications such as wafer inspection are required to have a high numerical aperture (hereinafter, it is referred to as NA) in order to achieve high resolution. In addition, in order to achieve high throughput, the objectives are also required to have a long working distance (hereinafter, it is referred to as WD) for improving a conveyance speed while avoiding the risk of collision between a subject and the objectives together with a wide field of view.

SUMMARY

A microscope objective according to one aspect of the present invention includes: a first lens group having positive refractive power and including a plurality of meniscus lenses with a concave surface facing an object side; a second lens group including a first cemented lens closest to the object side, the first cemented lens consisting of a positive lens and a negative lens; a third lens group consisting of a positive single lens; a fourth lens group including a first cemented meniscus lens with a concave surface facing the object side; a fifth lens group consisting of a second cemented meniscus lens with a concave surface facing an image side, the second cemented meniscus lens consisting of a positive lens and a negative lens; and a sixth lens group including a third cemented meniscus lens with a concave surface facing the object side, the third cemented meniscus lens consisting of a positive lens and a negative lens, the first to sixth lens groups being arranged in order from the object side. The microscope objective satisfies the following conditional expression.

$$0 < |f/f5| < 0.15 \quad (1)$$

Where, f is a focal length of the microscope objective. f5 is a focal length of the fifth lens group.

BRIEF DESCRIPTION OF DRAWINGS

The present invention will be more apparent from the following detailed description when the accompanying drawings are referenced.

FIGS. 3A to 3D are aberration diagrams of an optical system consisting of the microscope objective and the tube lens;

DESCRIPTION OF EMBODIMENTS

Figure 1:
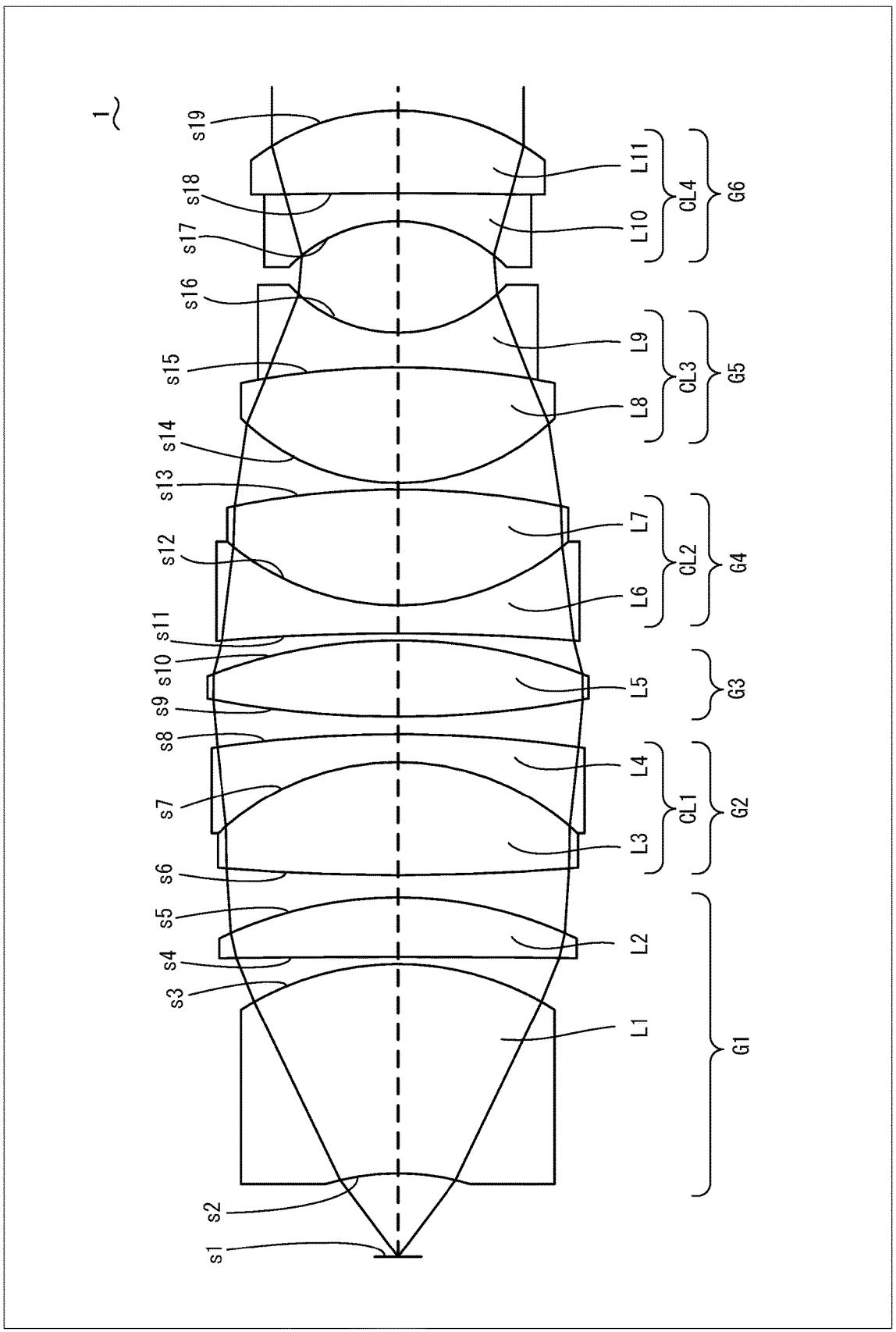
FIG. 1 is a cross-sectional view of a microscope objective according to a first embodiment of the present invention.

For example, Japanese Patent No. 3093835 discloses an objective having an NA of 0.7 at a magnification of 20 times, but this objective has a WD as short as 1 mm, which is not sufficient.

A microscope objective according to an embodiment of the present application will be described. The microscope objective according to the present embodiment (hereinafter, it is simply referred to as an objective) is an infinity-corrected microscope objective used in combination with a tube lens.

The microscope objective consists of first to six lens groups arranged in order from the object side. The first lens group has positive refractive power and includes a plurality of meniscus lenses having a concave surface facing the object side. The second lens group includes a cemented lens (hereinafter, it is referred to as a first cemented lens) closest to the object side and including a positive lens and a negative lens. The third lens group consists of a positive single lens. The fourth lens group includes a cemented meniscus lens (hereinafter, it is referred to as a first cemented meniscus lens) having a meniscus shape as a whole with a concave surface facing the object side. The fifth lens group consists of a cemented meniscus lens (hereinafter, it is referred to as a second cemented meniscus lens) having a meniscus shape as a whole with a concave surface facing the image side. The sixth lens group includes a cemented meniscus lens (hereinafter, it is referred to as a third cemented meniscus lens) having a meniscus shape as a whole with a concave surface facing the object side. Each of the second cemented meniscus lens and the third cemented meniscus lens consists of a positive lens and a negative lens.

Light from an object point is incident on the third lens group from the first lens group as divergent light, and the third lens group converts the divergent light into convergent light and causes the convergent light to be incident on the fourth lens group. The fourth lens group to the sixth lens group convert the convergent light from the third lens group into parallel light. When the first lens group to the third lens group once convert the divergent light from the object point into the convergent light and then cause the convergent light to be incident on the fourth lens group, a marginal ray height after the fourth lens group can be made lower than a marginal ray height inside the first lens group. As a result, the Petzval sum can be effectively corrected by the fifth lens group and the sixth lens group that constitute a Gaussian group, and as a result, the field curvature can be favorably corrected over a wide field of view.

Further, chromatic aberration can be corrected by disposing the cemented lenses (first cemented lens and first cemented meniscus lens) in regions (second lens group and fourth lens group) present around the third lens group having the highest ray height. In particular, by configuring these cemented lenses as achromatic lenses consisting of a positive lens with low dispersion and a negative lens with high dispersion, favorable chromatic aberration can be achieved.

In addition, the microscope objective is configured to satisfy the following conditional expression (1).

$$0<|f/f5|<0.15 \quad (1)$$

Where, f is a focal length of the microscope objective. f5 is a focal length of the fifth lens group.

The conditional expression (1) defines the power of the fifth lens group, and is mainly a conditional expression for satisfactorily correcting coma aberration. When |f/f5| exceeds the upper limit value (0.15), the power of the fifth lens group becomes too large with respect to the focal length. As a result, a large coma aberration occurs, and the symmetry of the coma aberration degrades.

According to the microscope objective configured as described above, it is possible to achieve a high numerical aperture and a long working distance at an appropriate magnification.

Note that the objective may be configured to satisfy the following conditional expression (1-1) instead of the conditional expression (1).

$$-0.15<f/f5<0 \quad (1\text{-}1)$$

The conditional expression (1-1) further defines the power of the fifth lens group in the conditional expression (1), and is a conditional expression for favorably correcting weak coma aberration generated in the tube lens 10.

A desirable configuration of the microscope objective will be described below.

The first lens group preferably consists of a first meniscus lens having a concave surface facing the object side and a second meniscus lens having a concave surface facing the object side. By configuring the first lens group with only the two meniscus lenses with the concave surfaces facing the object side, it is possible to converge a light ray while reducing occurrence of spherical aberration.

The second lens group desirably consists of the first cemented lens. By configuring the second lens group with only the first cemented lens, it is possible to converge the light ray while correcting chromatic aberration generated in the first lens group.

The fourth lens group desirably consists of the first cemented meniscus lens. By configuring the fourth lens group only with the first cemented meniscus lens, it is possible to reduce occurrence of higher-order spherical aberration while reducing chromatic aberration.

The sixth lens group desirably consists of the third cemented meniscus lens. By configuring the sixth lens group with only the third cemented meniscus lens, it is possible to satisfactorily correct the lateral chromatic aberration while effectively correcting the Petzval sum.

In addition, the microscope objective desirably satisfies at least one of the following conditional expressions (2) to (4).

$$0.5<f/f1<1.0 \quad (2)$$

$$3.4<n1+n2<4.0 \quad (3)$$

$$60<v3<90 \quad (4)$$

Where f1 is a focal length of the first lens group. n1 is a refractive index with respect to the e-line of a meniscus lens arranged closest to the object side among the plurality of meniscus lenses included in the first lens group. n2 is a refractive index with respect to the e-line of a meniscus lens arranged second closest to the object side among the plurality of meniscus lenses included in the first lens group. v3 is the Abbe number of the single lens constituting the third lens group.

The conditional expression (2) defines the power of the first lens group, and is mainly a conditional expression for effectively correcting spherical aberration. When f/f1 is less than the lower limit value (0.5), the power of the first lens group is too weak, and it becomes difficult to balance the Petzval sum. As a result, the performance of the entire optical system decreases. When f/f1 exceeds the upper limit value (1.0), the power of the first lens group is too large, so that large negative spherical aberration occurs in the first lens group. As a result, the spherical aberration cannot be completely corrected by the other lens groups, and it becomes difficult to perform good aberration correction.

The conditional expression (3) defines the sum of the refractive indexes of the two meniscus lenses on the object side among the meniscus lenses included in the first lens group, and is a conditional expression for reducing the Petzval sum while mainly allowing the microscope objective to have a high NA. When n1+n2 is less than the lower limit value (3.4), it is necessary to reduce the curvature radii of the meniscus lenses in order to gain the power of the first lens group, and as a result, the Petzval sum cannot be corrected in the entire optical system. When n1+n2 exceeds the upper limit value (4.0), a difference between the refractive power for respective colors becomes too large, and it becomes difficult to satisfactorily correct the axial chromatic aberration.

The conditional expression (4) defines the Abbe number of the third lens group, and is mainly a conditional expression for favorably correcting chromatic aberration. When v3 falls below the lower limit value (60), the axial chromatic aberration increases, and it becomes difficult to correct the axial chromatic aberration well. When v3 exceeds the upper limit value (90), it is difficult to correct the lateral chromatic aberration.

Note that the microscope objective having the above-described configuration has a high NA and a long WD at a magnification of about 20 times. More specifically, the microscope objective has a focal length of 8 mm or more and 10 mm or less, and further has a WD of 3 mm or more and 6 mm or less.

Embodiments of the microscope objective described above will be specifically described below.

First Embodiment

FIG. 1 is a cross-sectional view of a microscope objective 1 according to the present embodiment. The microscope objective 1 consists of a first lens group G1 having positive refractive power and including a plurality of meniscus lenses with a concave surface facing an object side, a second lens group G2 including a first cemented lens closest to the object side, a third lens group G3 consisting of a positive single lens, a fourth lens group G4 including a first cemented meniscus lens with a concave surface facing the object side, a fifth lens group G5 consisting of a second cemented meniscus lens with a concave surface facing an image side, and a sixth lens group G6 including a third cemented meniscus lens with a concave surface facing the object side, and the first to sixth lens groups G1 to G6 are arranged in order from the object side.

The first lens group G1 consists of a lens L1 that is a meniscus lens having a concave surface facing the object side and a lens L2 that is a meniscus lens having a concave surface facing the object side, and the lenses L1 and L2 are arranged in order from the object side.

The second lens group G2 consists of a cemented lens CL1 that is the first cemented lens. The cemented lens CL1 is a two-piece cemented lens, and consists of a lens L3 that is a biconvex lens and a lens L4 that is a meniscus lens having a concave surface facing the object side, and the lenses L3 and L4 are arranged in order from the object side. The lens L4 is a negative lens.

The third lens group G3 consists of a lens L5 that is a positive single lens, more specifically, a biconvex lens.

The fourth lens group G4 consists of a cemented lens CL2 that is the first cemented meniscus lens. The cemented lens CL2 consists of a lens L6 that is a biconcave lens and a lens L7 that is a biconvex lens, and the lenses L6 and L7 are arranged in order from the object side.

The fifth lens group G5 consists of a cemented lens CL3 that is the second cemented meniscus lens. The cemented lens CL3 consists of a lens L8 that is a biconvex lens and a lens L9 that is a biconcave lens, and the lenses L8 and L9 are arranged in order from the object side.

The sixth lens group G6 consists of a cemented lens CL4 that is the third cemented meniscus lens. The cemented lens CL4 consists of a lens L10 that is a meniscus lens having a concave surface facing the object side and a lens L11 that is a meniscus lens having a concave surface facing the object side, and the lenses L10 and L11 are arranged in order from the object side. The lens L10 is a negative lens, and the lens L11 is a positive lens.

Various data of the microscope objective 1 are as follows. $NA_{ob}$ is the numerical aperture of the microscope objective 1 on the object side. WD is the working distance of the microscope objective 1. f2, f3, f4, and f6 are the focal length of the second lens group G2, the focal length of the third lens group G3, the focal length of the fourth lens group G4, and the focal length of the sixth lens group G6, respectively. The other parameters are as described above.

$NA_{ob}$=0.6, WD=3.6004 mm, f=8.9968 mm, f1=13.5880 mm, f2=1789.8 mm, f3=26.2961 mm, f4=−104.3538 mm, f5=−63.4877 mm, f6=−98.2662 mm, n1=1.88815, n2=1.75844, and v3=71.3.

Lens data of the microscope objective 1 is as follows. Note that INF in the lens data indicates infinity (∞).

Microscope Objective Lens 1

| s | r | d | ne | vd |
|---|---|---|---|---|
| 1 | INF | 3.6004 | | |
| 2 | −10.6173 | 9 | 1.88815 | 40.76 |
| 3 | −12.4513 | 0.3 | | |
| 4 | −534.4304 | 2.5576 | 1.75844 | 52.32 |
| 5 | −17.5195 | 0.9526 | | |
| 6 | 90.9109 | 4.8718 | 1.43986 | 94.66 |
| 7 | −11.2089 | 1.2 | 1.61664 | 44.49 |
| 8 | −54.4275 | 0.7449 | | |
| 9 | 43.0506 | 3.2787 | 1.57098 | 71.3 |
| 10 | −22.4173 | 0.3 | | |
| 11 | −93.0246 | 1.2 | 1.62409 | 36.26 |
| 12 | 11.0585 | 4.9999 | 1.43986 | 94.66 |
| 13 | −34.4567 | 0.2664 | | |
| 14 | 9.5094 | 4.971 | 1.62033 | 63.33 |
| 15 | −33.7076 | 1.5 | 1.67717 | 38.26 |
| 16 | 6.3158 | 4.7868 | | |
| 17 | −6.5289 | 1.2 | 1.7434 | 32.33 |
| 18 | −282.4159 | 3.5697 | 1.81643 | 22.76 |
| 19 | −10.2299 | 120 | | |

Where, s represents a surface number, r represents a curvature radius (mm), d represents a surface spacing (mm), ne represents a refractive index with respect to the e-line, and vd represents the Abbe number. These symbols are the same in the following embodiments. A surface indicated by a surface number s1 is a sample surface. Surfaces indicated by surface numbers s2 and s19 are the lens surface closest to the object side of the microscope objective 1 and the lens surface closest to the image side of the microscope objective 1, respectively. For example, a surface spacing d1 indicates a distance on the optical axis from the surface indicated by the surface number s1 to the surface indicated by the surface number s2. A surface spacing d19 indicates a distance (120 mm) on the optical axis from the surface indicated by the surface number s19 to the tube lens.

As described below, the microscope objective 1 satisfies the following conditional expressions (1) to (4).

$$|f/f5|=|-0.142|=0.142 \tag{1}$$

$$f/f1=0.66 \tag{2}$$

$$n1+n2=3.65 \tag{3}$$

$$v3=71.3 \tag{4}$$

Figure 2:
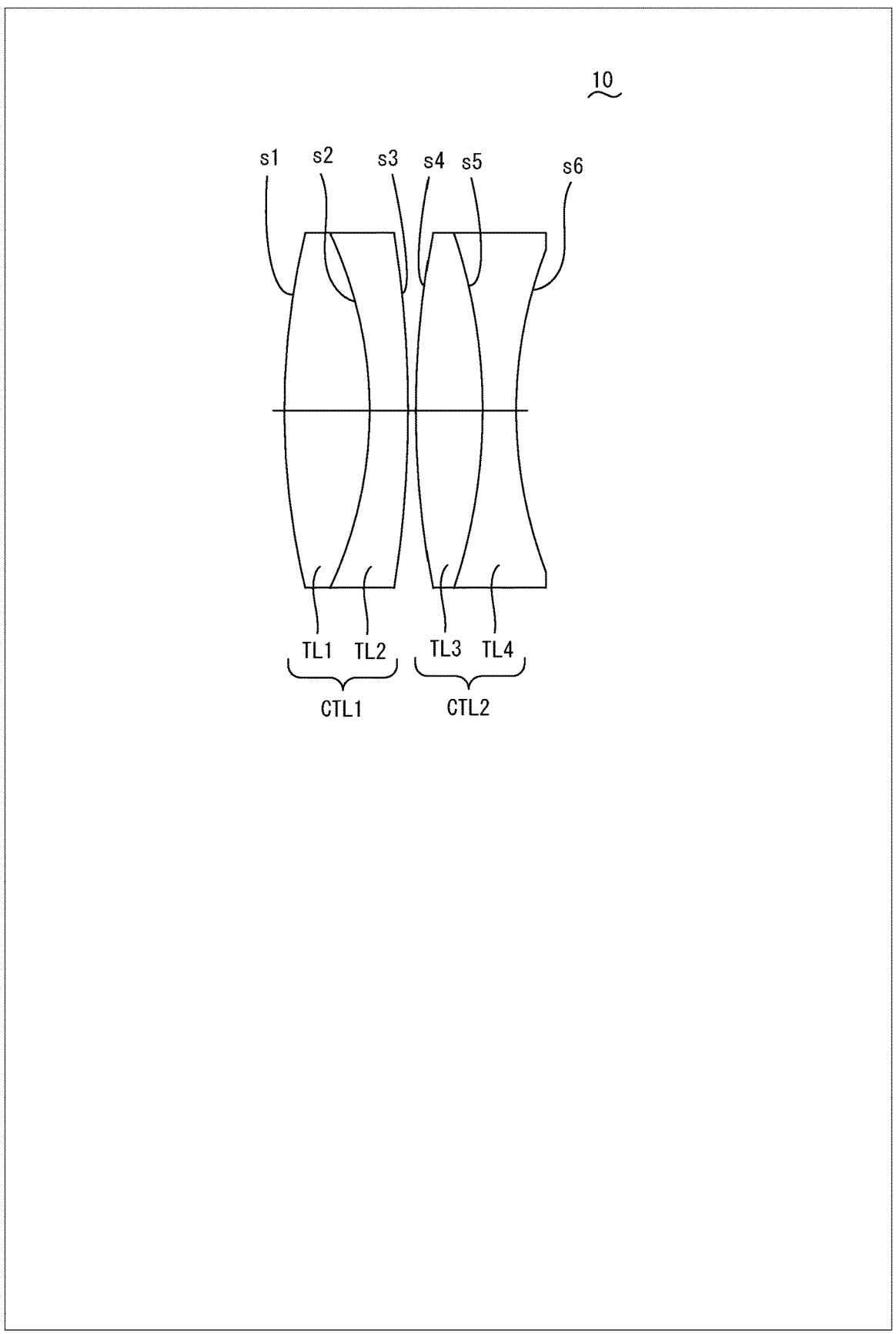
FIG. 2 is a cross-sectional view of a tube lens.

FIG. 2 is a cross-sectional view of the tube lens 10 used in combination with the microscope objective 1. The tube lens 10 is a microscope tube lens that forms an enlarged image of an object in combination with the infinity-corrected objective. The tube lens 10 consists of a cemented lens TCL1 and a cemented lens TCL2 that are arranged in order from the object side. The cemented lens TCL1 consists of a lens TL1 that is a biconvex lens and a lens TL2 that is a meniscus lens with a concave surface facing the object side, and the lenses TL1 and TL2 are arranged in order from the object side. The cemented lens TCL2 consists of a lens TL3 that is a biconvex lens and a lens TL4 that is a biconcave lens, and the lenses TL3 and TL4 are arranged in order from the object side. The tube lens 10 is arranged such that the distance on the optical axis from the lens surface (surface number s19) closest to the image side of the microscope objective 1 to the lens surface (surface number s1) closest to the object side of the tube lens 10 is 120 mm. The focal length of the tube lens 10 is 180 mm.

Lens data of the tube lens 10 is as follows.

Imaging Lens 10

| s | r | d | ne | vd |
|---|---|---|---|---|
| 1 | 68.7541 | 7.7321 | 1.48915 | 70.23 |
| 2 | −37.5679 | 3.4742 | 1.81078 | 40.92 |
| 3 | −102.8477 | 0.6973 | | |
| 4 | 84.3099 | 6.0238 | 1.83932 | 37.16 |
| 5 | −50.7100 | 3.0298 | 1.64824 | 40.82 |
| 6 | 40.6619 | | | |

Figure 3B:
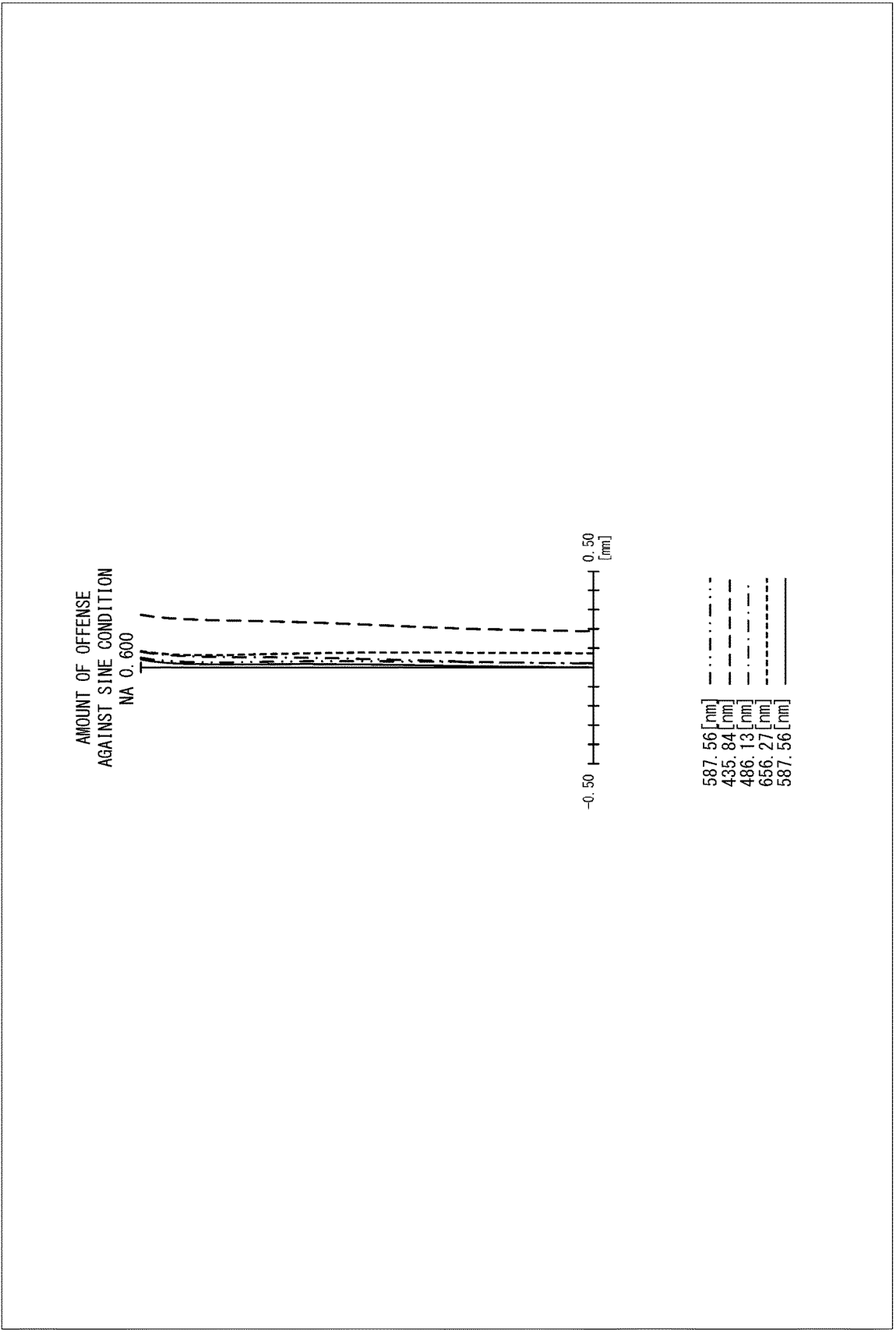
Figure 3C:
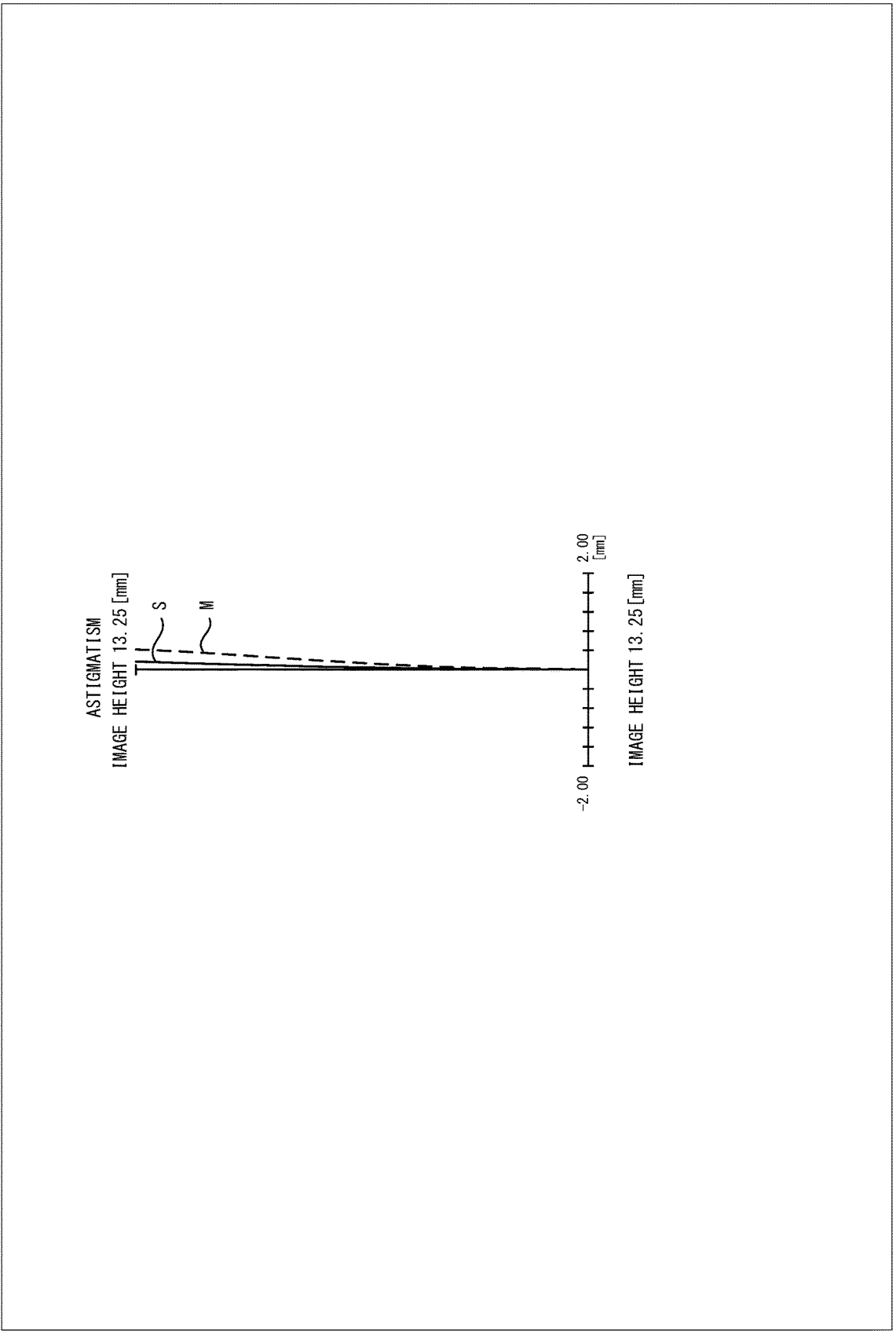
Figure 3D:
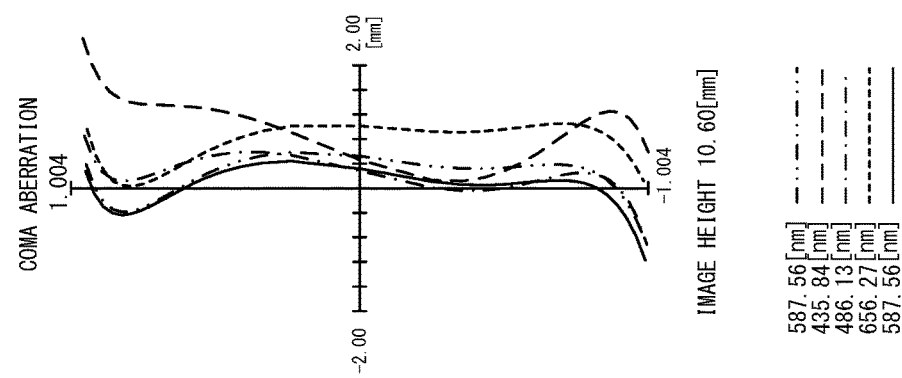

FIGS. 3A to 3D are aberration diagrams of the optical system consisting of the microscope objective 1 and the tube lens 10, and illustrate aberration in an image plane in which the microscope objective 1 and the tube lens 10 form an optical image. FIG. 3A is a spherical aberration diagram. FIG. 3B is a diagram illustrating the amount of offense against a sine condition. FIG. 3C is an astigmatism diagram. FIG. 3D is a diagram illustrating coma aberration at an image height ratio of 80% (image height of 10.60 mm). Note that in the figure, "M" indicates a meridional component and "S" indicates a sagittal component. As illustrated in FIGS. 3A to 3D, in the present embodiment, the aberration is satisfactorily corrected over a wide field of view.

Second Embodiment

Figure 4:
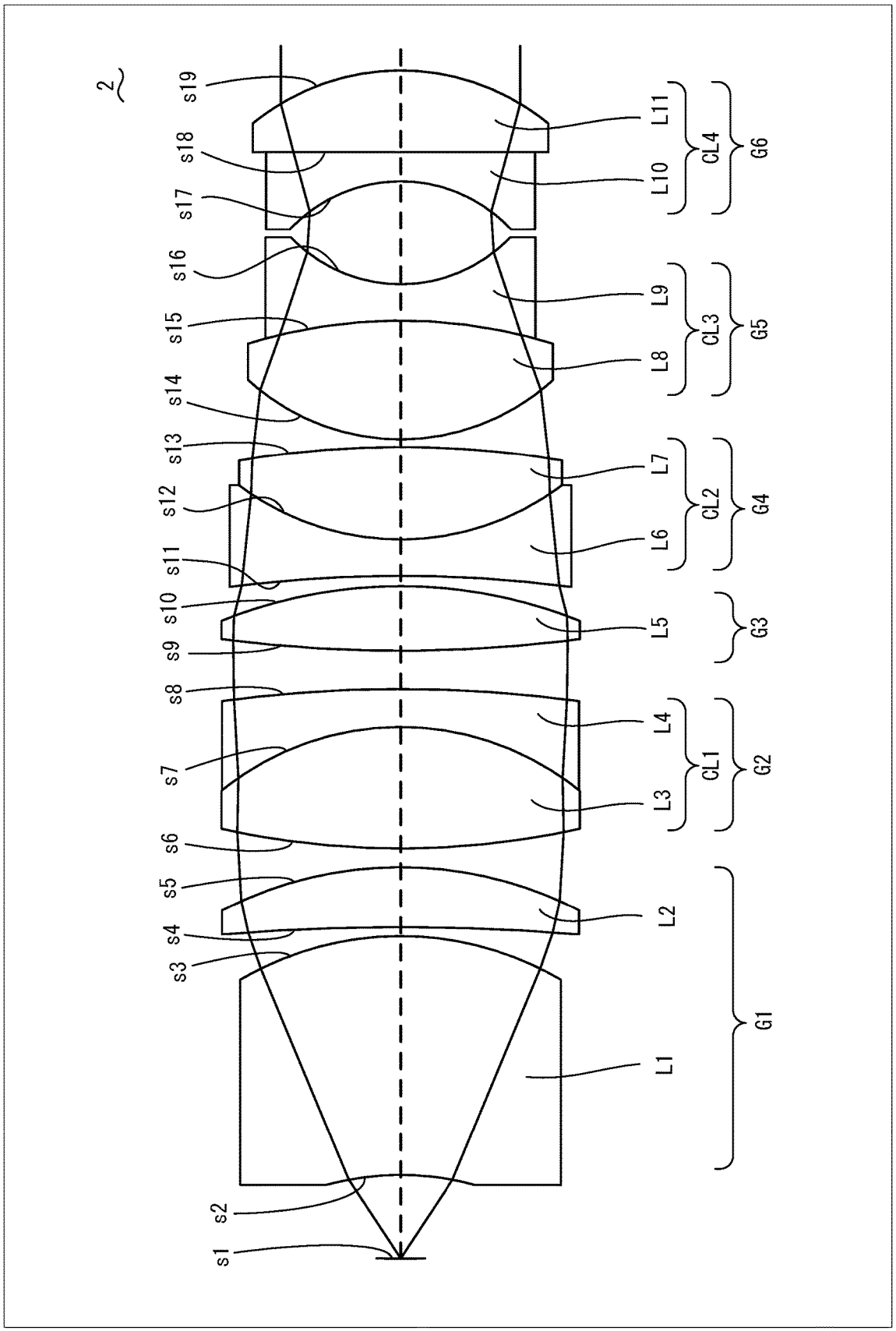
FIG. 4 is a cross-sectional view of a microscope objective according to a second embodiment of the present invention.

FIG. 4 is a cross-sectional view of a microscope objective 2 according to the present embodiment. The microscope objective 2 consists of a first lens group G1 having positive refractive power and including a plurality of meniscus lenses with a concave surface facing an object side, a second lens group G2 including a first cemented lens closest to the object side, a third lens group G3 consisting of a positive single lens, a fourth lens group G4 including a first cemented meniscus lens with a concave surface facing the object side, a fifth lens group G5 consisting of a second cemented meniscus lens with a concave surface facing an image side, and a sixth lens group G6 including a third cemented meniscus lens with a concave surface facing the object side, and the first to sixth lens groups G1 to G6 are arranged in order from the object side.

The first lens group G1 consists of a lens L1 that is a meniscus lens having a concave surface facing the object side and a lens L2 that is a meniscus lens having a concave surface facing the object side, and the lenses L1 and L2 are arranged in order from the object side.

The second lens group G2 consists of a cemented lens CL1 that is the first cemented lens. The cemented lens CL1 is a two-piece cemented lens, and consists of a lens L3 that is a biconvex lens and a lens L4 that is a meniscus lens having a concave surface facing the object side, and the lenses L3 and L4 are arranged in order from the object side. The lens L4 is a negative lens.

The third lens group G3 consists of a lens L5 that is a positive single lens, more specifically, a biconvex lens.

The fourth lens group G4 consists of a cemented lens CL2 that is the first cemented meniscus lens. The cemented lens CL2 consists of a lens L6 that is a biconcave lens and a lens L7 that is a biconvex lens, and the lenses L6 and L7 are arranged in order from the object side.

The fifth lens group G5 consists of a cemented lens CL3 that is the second cemented meniscus lens. The cemented lens CL3 consists of a lens L8 that is a biconvex lens and a lens L9 that is a biconcave lens, and the lenses L8 and L9 are arranged in order from the object side.

The sixth lens group G6 consists of a cemented lens CL4 that is the third cemented meniscus lens. The cemented lens CL4 consists of a lens L10 that is a plano-concave lens having a concave surface facing the object side and a lens L11 that is a plano-convex lens having a convex surface facing the image side, and the lenses L10 and L11 are arranged in order from the object side.

Various data of the microscope objective 2 are as follows.

$NA_{ob}$=0.55, WD=3.4666 mm, f=8.9970 mm, f1=13.8127 mm, f2=106.4855 mm, f3=29.9445 mm, f4=−60.8870 mm, f5=−65.0208 mm, f6=−122.8208 mm, n1=1.88815, n2=1.75844, and v3=81.54.

Lens data of the microscope objective 2 is as follows.

| Microscope Objective Lens 2 | | | | |
|---|---|---|---|---|
| s | r | d | ne | vd |
| 1 | INF | 3.4666 | | |
| 2 | −11.5092 | 9.9104 | 1.88815 | 40.76 |
| 3 | −13.0336 | 0.371 | | |
| 4 | −88.3803 | 2.5 | 1.75844 | 52.32 |
| 5 | −16.0029 | 0.7708 | | |
| 6 | 33.9655 | 5.0365 | 1.43986 | 94.66 |
| 7 | −11.6881 | 1.5715 | 1.61669 | 44.27 |
| 8 | −54.1718 | 1.603 | | |
| 9 | 57.8054 | 2.6729 | 1.49846 | 81.54 |
| 10 | −19.8121 | 0.4311 | | |
| 11 | −54.2778 | 1.502 | 1.62409 | 36.26 |
| 12 | 11.0436 | 3.8454 | 1.43986 | 94.66 |
| 13 | −40.0417 | 0.317 | | |

| Microscope Objective Lens 2 | | | | |
|---|---|---|---|---|
| s | r | d | ne | vd |
| 14 | 9.2998 | 4.925 | 1.62033 | 63.33 |
| 15 | −21.2324 | 1.5 | 1.67717 | 38.26 |
| 16 | 6.2637 | 4.2895 | | |
| 17 | −6.2403 | 1.2064 | 1.7434 | 32.33 |
| 18 | INF | 3.3809 | 1.81643 | 22.76 |
| 19 | −9.5936 | 120 | | |

As described below, the microscope objective 2 satisfies the following conditional expressions (1) to (4).

$|f/f5|=|-0.138|=0.138$ (1)

$f/f1=0.65$ (2)

$n1+n2=3.65$ (3)

$v3=81.5$ (4)

Figure 5A:
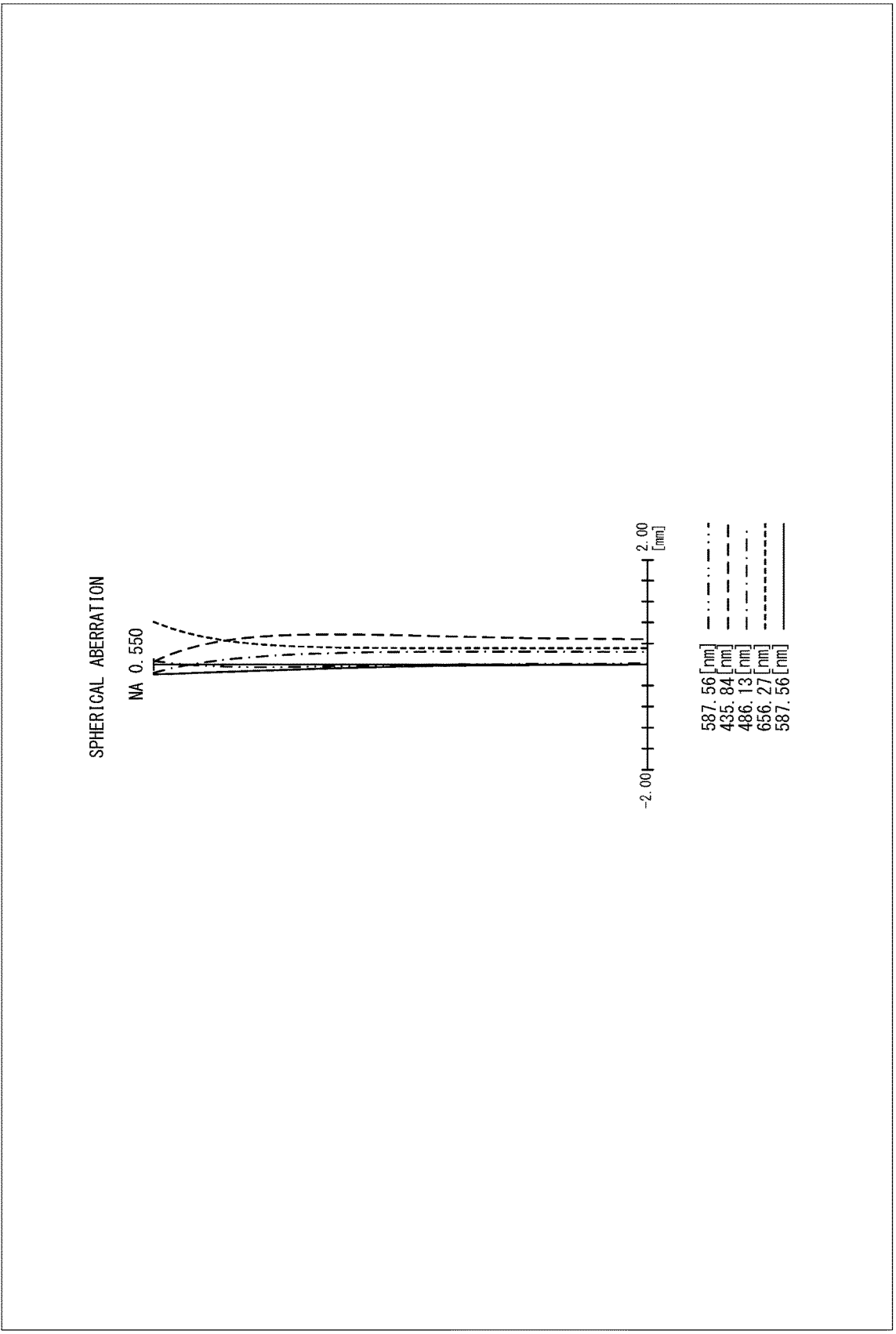
FIGS. 5A to 5D are aberration diagrams of an optical system consisting of the microscope objective and the tube lens.
Figure 5B:
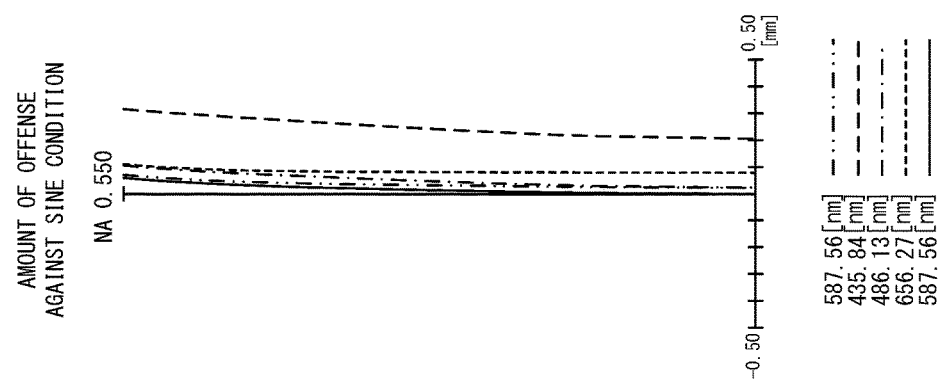
Figure 5C:
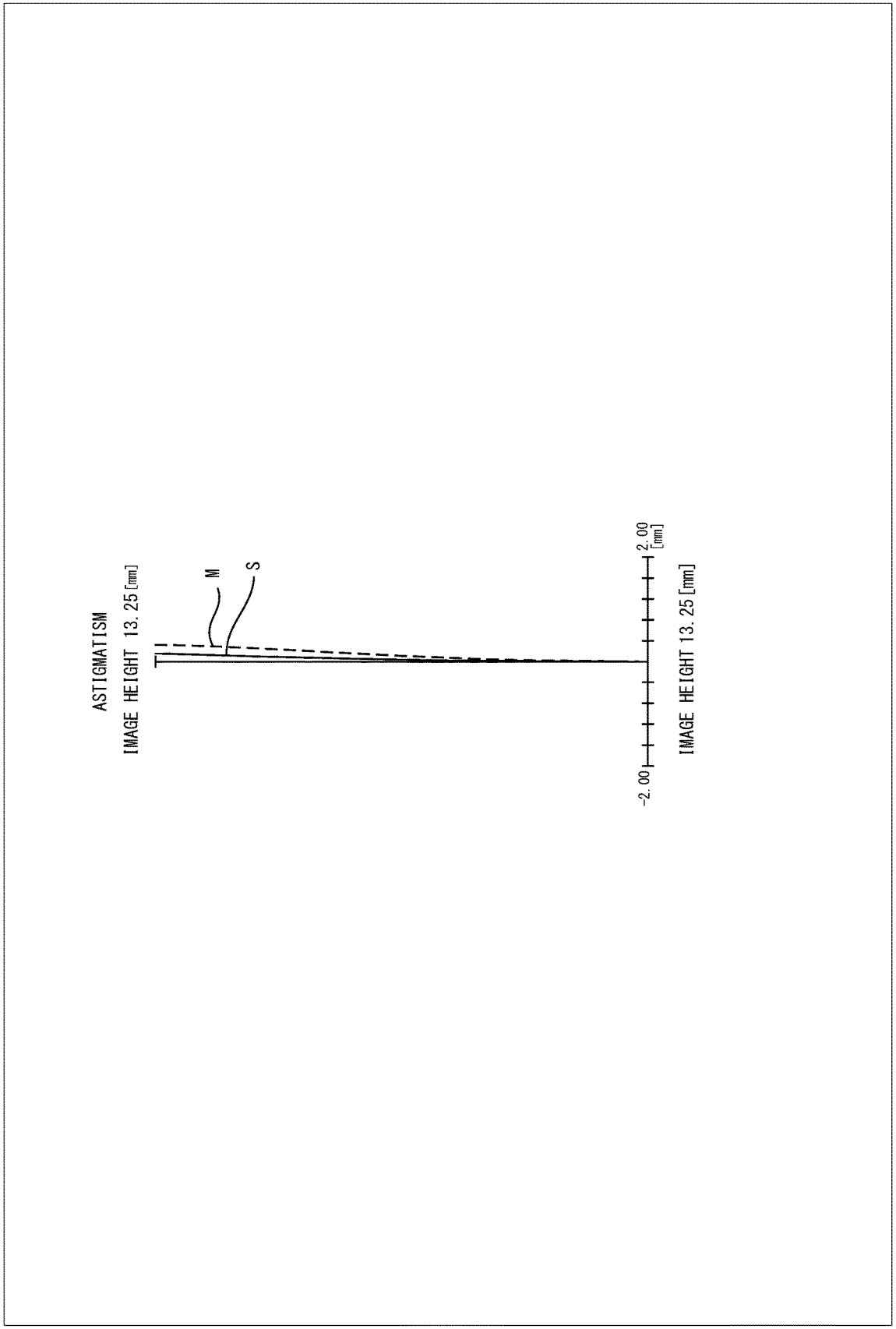
Figure 5D:
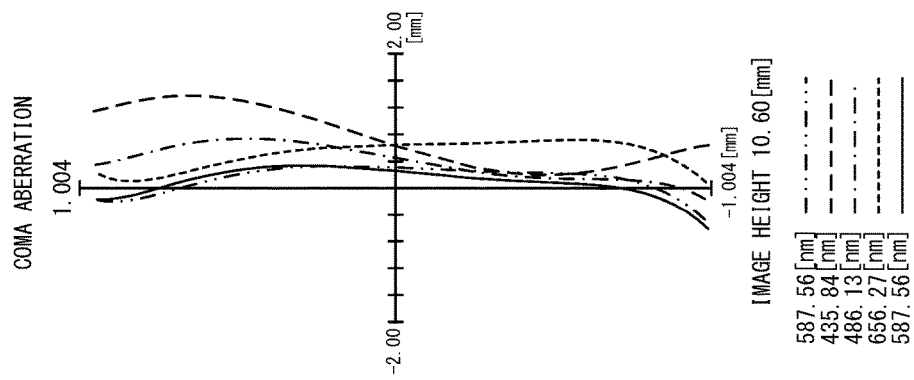

FIGS. 5A to 5D are aberration diagrams of an optical system consisting of the microscope objective 2 and the tube lens 10, and illustrate aberration in an image plane in which the microscope objective 2 and the tube lens 10 form an optical image. FIG. 5A is a spherical aberration diagram. FIG. 5B is a diagram illustrating the amount of offense against a sine condition. FIG. 5C is an astigmatism diagram. FIG. 5D is a diagram illustrating coma aberration at an image height ratio of 80% (image height of 10.60 mm). As illustrated in FIGS. 5A to 5D, in the present embodiment, the aberration is satisfactorily corrected over a wide field of view.

Third Embodiment

Figure 6:
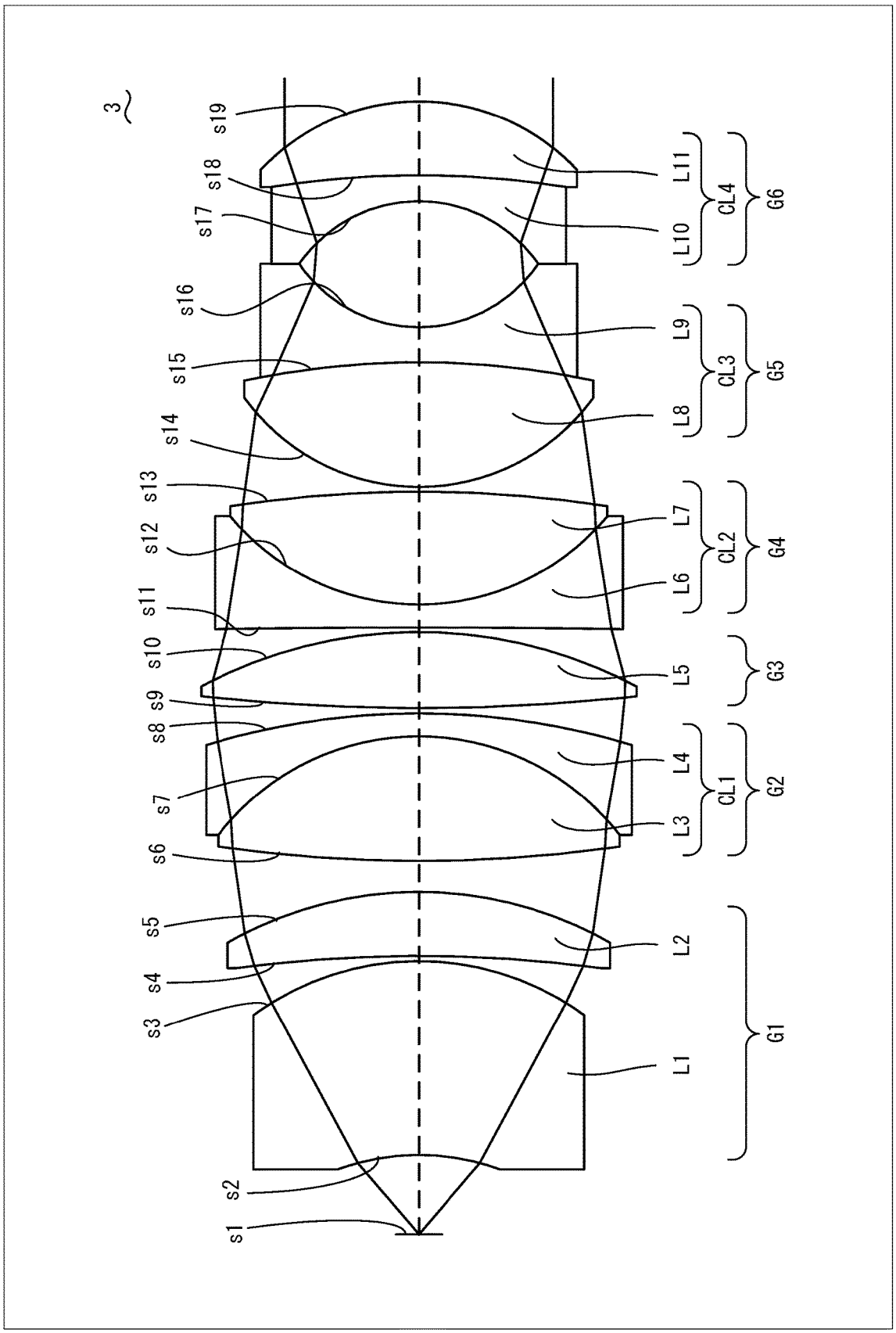
FIG. 6 is a cross-sectional view of a microscope objective according to a third embodiment of the present invention.

FIG. 6 is a cross-sectional view of a microscope objective 3 according to the present embodiment. The microscope objective 3 consists of a first lens group G1 having positive refractive power and including a plurality of meniscus lenses with a concave surface facing an object side, a second lens group G2 including a first cemented lens closest to the object side, a third lens group G3 consisting of a positive single lens, a fourth lens group G4 including a first cemented meniscus lens with a concave surface facing the object side, a fifth lens group G5 consisting of a second cemented meniscus lens with a concave surface facing an image side, and a sixth lens group G6 including a third cemented meniscus lens with a concave surface facing the object side, and the first to sixth lens groups G1 to G6 are arranged in order from the object side.

The first lens group G1 consists of a lens L1 that is a meniscus lens having a concave surface facing the object side and a lens L2 that is a meniscus lens having a concave surface facing the object side, and the lenses L1 and L2 are arranged in order from the object side.

The second lens group G2 consists of a cemented lens CL1 that is the first cemented lens. The cemented lens CL1 is a two-piece cemented lens, and consists of a lens L3 that is a biconvex lens and a lens L4 that is a meniscus lens having a concave surface facing the object side, and the lenses L3 and L4 are arranged in order from the object side. The lens L4 is a negative lens.

The third lens group G3 consists of a lens L5 that is a positive single lens, more specifically, a biconvex lens.

The fourth lens group G4 consists of a cemented lens CL2 that is the first cemented meniscus lens. The cemented lens CL2 consists of a lens L6 that is a biconcave lens and a lens L7 that is a biconvex lens, and the lenses L6 and L7 are arranged in order from the object side.

The fifth lens group G5 consists of a cemented lens CL3 that is the second cemented meniscus lens. The cemented lens CL3 consists of a lens L8 that is a biconvex lens and a lens L9 that is a biconcave lens, and the lenses L8 and L9 are arranged in order from the object side.

The sixth lens group G6 consists of a cemented lens CL4 that is the third cemented meniscus lens. The cemented lens CL4 consists of a lens L10 that is a meniscus lens having a concave surface facing the object side and a lens L11 that is a meniscus lens having a concave surface facing the object side, and the lenses L10 and L11 are arranged in order from the object side. The lens L10 is a negative lens, and the lens L11 is a positive lens.

Various data of the microscope objective 3 are as follows.
$NA_{ob}$=0.65, WD=3.4661 mm, f=8.9970 mm, f1=15.6389 mm, f2=109.3313 mm, f3=29.0448 mm, f4=−101.9587 mm, f5=−67.4160 mm, f6=−128.6295 mm, n1=1.8976, n2=1.82017, and v3=71.3.

Lens data of the microscope objective 3 is as follows.

Microscope Objective Lens 3

| s | r | d | ne | vd |
|---|---|---|---|---|
| 1 | INF | 3.4661 | | |
| 2 | −10.2076 | 8.4722 | 1.8976 | 37.13 |
| 3 | −12.167 | 0.2237 | | |
| 4 | −59.6793 | 2.7935 | 1.82017 | 46.62 |
| 5 | −16.7783 | 1.3465 | | |
| 6 | 61.0527 | 5.457 | 1.43986 | 94.66 |
| 7 | −11.0138 | 1 | 1.64132 | 42.41 |
| 8 | −31.8199 | 0.2295 | | |
| 9 | 87.9055 | 3.3187 | 1.57098 | 71.3 |
| 10 | −20.1597 | 0.2007 | | |
| 11 | −500 | 1 | 1.62409 | 36.26 |
| 12 | 10.6634 | 4.9398 | 1.43986 | 94.66 |
| 13 | −53.6246 | 0.2 | | |
| 14 | 9.3665 | 5.4442 | 1.6052 | 65.44 |
| 15 | −36.3792 | 1.541 | 1.67717 | 38.26 |
| 16 | 6.284 | 5.506 | | |
| 17 | −6.3324 | 1.1255 | 1.7434 | 32.33 |
| 18 | −40.2859 | 3.2353 | 1.81643 | 22.76 |
| 19 | −9.4276 | 120 | | |

As described below, the microscope objective 3 satisfies the following conditional expressions (1) to (4).

$$|f/f5|=|-0.133|=0.133 \quad (1)$$

$$f/f1=0.58 \quad (2)$$

$$n1+n2=3.72 \quad (3)$$

$$v3=71.3 \quad (4)$$

Figure 7A:
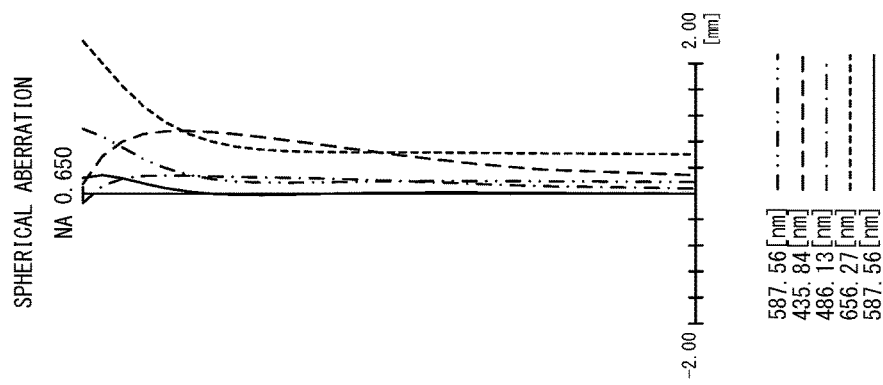
FIGS. 7A to 7D are aberration diagrams of an optical system consisting of the microscope objective and the tube lens.
Figure 7B:
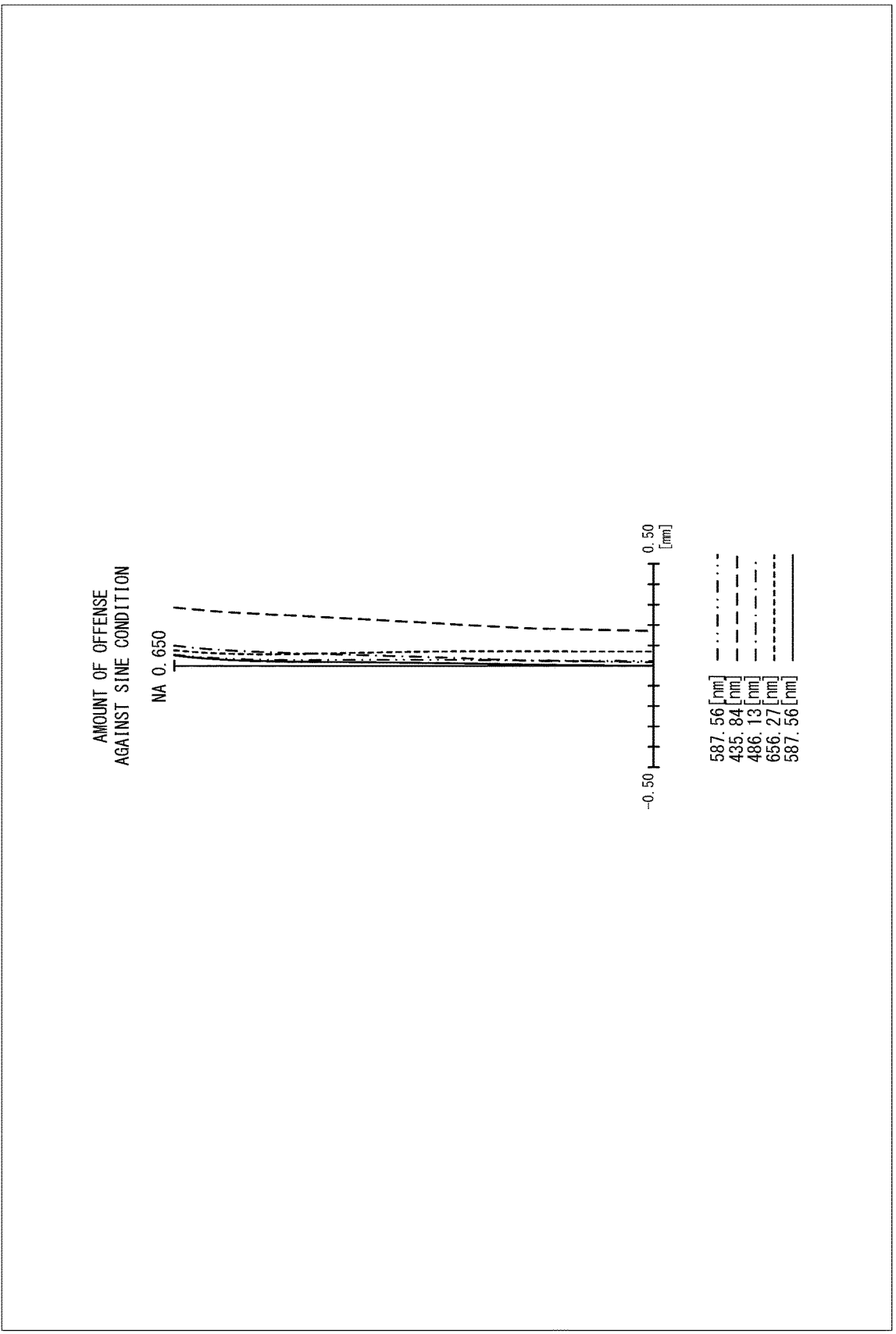
Figure 7C:
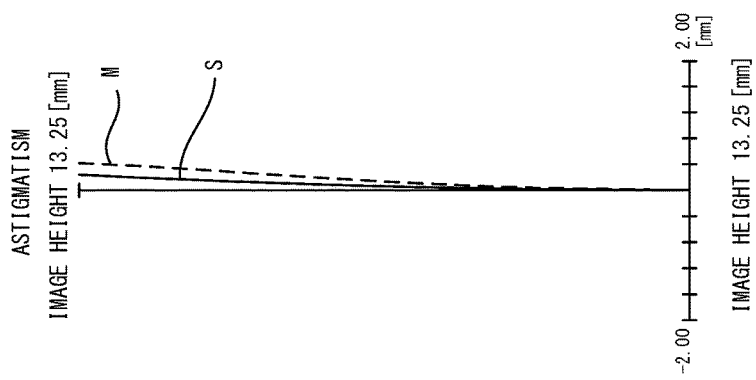
Figure 7D:
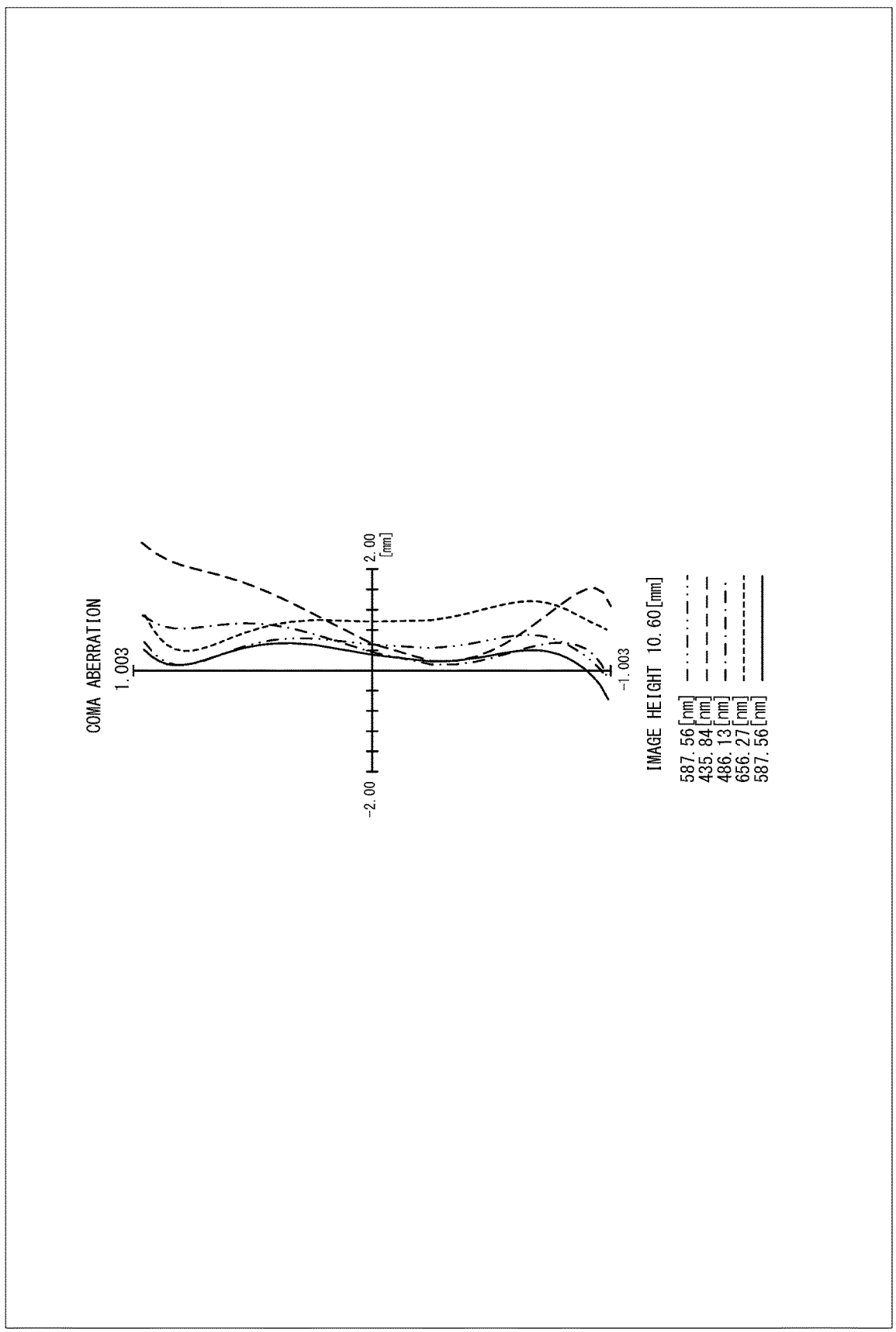

FIGS. 7A to 7D are aberration diagrams of an optical system consisting of the microscope objective 3 and the tube lens 10, and illustrate aberration in an image plane in which the microscope objective 3 and the tube lens 10 form an optical image. FIG. 7A is a spherical aberration diagram. FIG. 7B is a diagram illustrating the amount of offense against a sine condition. FIG. 7C is an astigmatism diagram. FIG. 7D is a diagram illustrating coma aberration at an image height ratio of 80% (image height of 10.60 mm). As illustrated in FIGS. 7A to 7D, in the present embodiment, the aberration is satisfactorily corrected over a wide field of view.

What is claimed is:

1. A microscope objective comprising:
   a first lens group having positive refractive power and including a plurality of meniscus lenses with a concave surface facing an object side;
   a second lens group including a first cemented lens closest to the object side, the first cemented lens consisting of a positive lens and a negative lens;
   a third lens group consisting of a positive single lens;
   a fourth lens group including a first cemented meniscus lens with a concave surface facing the object side;
   a fifth lens group consisting of a second cemented meniscus lens with a concave surface facing an image side, the second cemented meniscus lens consisting of a positive lens and a negative lens; and
   a sixth lens group including a third cemented meniscus lens with a concave surface facing the object side, the third cemented meniscus lens consisting of a positive lens and a negative lens,
   the first to sixth lens groups being arranged in order from the object side, wherein
   a conditional expression of $$0<|f/f5|<0.15 \quad (1)$$

is satisfied, where f is a focal length of the microscope objective, and f5 is a focal length of the fifth lens group.

2. The microscope objective according to claim 1, wherein
   the sixth lens group consists of the third cemented meniscus lens.

3. The microscope objective according to claim 1, wherein
   the first lens group consists of:
   a first meniscus lens having a concave surface facing the object side; and
   a second meniscus lens having a concave surface facing the object side.

4. The microscope objective according to claim 2, wherein
   the first lens group consists of:
   a first meniscus lens having a concave surface facing the object side; and
   a second meniscus lens having a concave surface facing the object side.

5. The microscope objective according to claim 1, wherein
   the second lens group consists of the first cemented lens.

6. The microscope objective according to claim 4, wherein
   the second lens group consists of the first cemented lens.

7. The microscope objective according to claim 1, wherein
   the fourth lens group consists of the first cemented meniscus lens.

8. The microscope objective according to claim 2, wherein
   the fourth lens group consists of the first cemented meniscus lens.

9. The microscope objective according to claim 6, wherein
   the fourth lens group consists of the first cemented meniscus lens.

10. The microscope objective according to claim 1, wherein
    a conditional expression of $$0.5<f/f1<1.0 \quad (2)$$

is satisfied, where, f1 is a focal length of the first lens group.

11. The microscope objective according to claim 9, wherein a conditional expression of $$0.5 < f/f1 < 1.0 \tag{2}$$

is satisfied, where f1 is a focal length of the first lens group.

12. The microscope objective according to claim 1, wherein a conditional expression of $$3.4 < n1+n2 < 4.0 \tag{3}$$

is satisfied, where n1 is a refractive index with respect to an e-line of a meniscus lens arranged closest to the object side among the plurality of meniscus lenses included in the first lens group, and n2 is a refractive index with respect to an e-line of a meniscus lens arranged second closest to the object side among the plurality of meniscus lenses included in the first lens group.

13. The microscope objective according to claim 10, wherein a conditional expression of $$3.4 < n1+n2 < 4.0 \tag{3}$$

is satisfied, where n1 is a refractive index with respect to an e-line of a meniscus lens arranged closest to the object side among the plurality of meniscus lenses included in the first lens group, and n2 is a refractive index with respect to an e-line of a meniscus lens arranged second closest to the object side among the plurality of meniscus lenses included in the first lens group.

14. The microscope objective according to claim 9, wherein a conditional expression of $$3.4 < n1+n2 < 4.0 \tag{3}$$

is satisfied, where n1 is a refractive index with respect to an e-line of a meniscus lens arranged closest to the object side among the plurality of meniscus lenses included in the first lens group, and n2 is a refractive index with respect to an e-line of a meniscus lens arranged second closest to the object side among the plurality of meniscus lenses included in the first lens group.

15. The microscope objective according to claim 1, wherein a conditional expression of $$60 < v3 < 90 \tag{4}$$

is satisfied, where v3 is the Abbe number of the single lens constituting the third lens group.

16. The microscope objective according to claim 9, wherein a conditional expression of $$60 < v3 < 90 \tag{4}$$

is satisfied, where v3 is the Abbe number of the single lens constituting the third lens group.

17. The microscope objective according to claim 10, wherein a conditional expression of $$60 < v3 < 90 \tag{4}$$

is satisfied, where v3 is the Abbe number of the single lens constituting the third lens group.

18. The microscope objective according to claim 12, wherein a conditional expression of $$60 < v3 < 90 \tag{4}$$

is satisfied, where v3 is the Abbe number of the single lens constituting the third lens group.

19. The microscope objective according to claim 13, wherein a conditional expression of $$60 < v3 < 90 \tag{4}$$

is satisfied, where v3 is the Abbe number of the single lens constituting the third lens group.

* * * * *